April 25, 1933.     A. SHUMAN     1,905,006

METHOD OF MAKING CORRUGATED WIRE GLASS

Filed June 25, 1930

WITNESS:

INVENTOR

Arno Shuman
BY
Augustus B. Stoughton
ATTORNEY.

Patented Apr. 25, 1933

1,905,006

UNITED STATES PATENT OFFICE

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY

METHOD OF MAKING CORRUGATED WIRE GLASS

Application filed June 25, 1930. Serial No. 463,624.

In the manufacture of corrugated wire glass, the sheet of glass while plastic, or more or less plastic from heat, rests upon a lengthwise corrugated table and the wire mesh is embedded through one face of the sheet to substantially a position midway between the top and bottom faces of the sheet. The sheet of wire mesh contains twists or knots and when a twist or knot enters the sheet of glass at the peak portion of a corrugation it inflicts a wound, cut or incision of such size and character that the plastic glass, flowing under the influence of gravity toward the valleys of the corrugations, leaves the wound, cut or incision formed by the entry of the knot or twist into the glass open, and this produces blemishes at intervals in the finished sheet. The wire of the mesh being much smaller than the twists or knots does not produce an incision, wound or cut in the glass of size and character that permits or causes the glass to flow downward into the valleys to any objectionable extent and therefore does not produce a defect or blemish in the finished sheet.

It is the principal object of the present invention to obviate or prevent in the finished sheet of corrugated wire glass blemishes or defects produced by the entry of knots or twists at the peaks of the corrugations, and which, while comparatively few in number, are sufficiently numerous to make the finished sheet of glass imperfect.

Generally stated the invention consists, in the manufacture of lengthwise corrugated wire glass, of the improved step for healing the wounds inflicted by embedding the knots or twists of the wire mesh into the peaks of the corrugations, which step comprises closing the wounds by pushing the plastic glass from the valleys towards the peaks of the corrugations. This may be done by rolling the glass after the embedment of the knots or twists and mesh with a corrugated roll which pushes the glass up from the valleys toward the peaks closing the wounds, cuts or incisions at the peaks.

In the following description reference will be made to the accompanying drawing forming part hereof and in which, Figure 1 is a side elevational view with parts broken away illustrating apparatus suitable for the practice of the invention.

Figure 1:
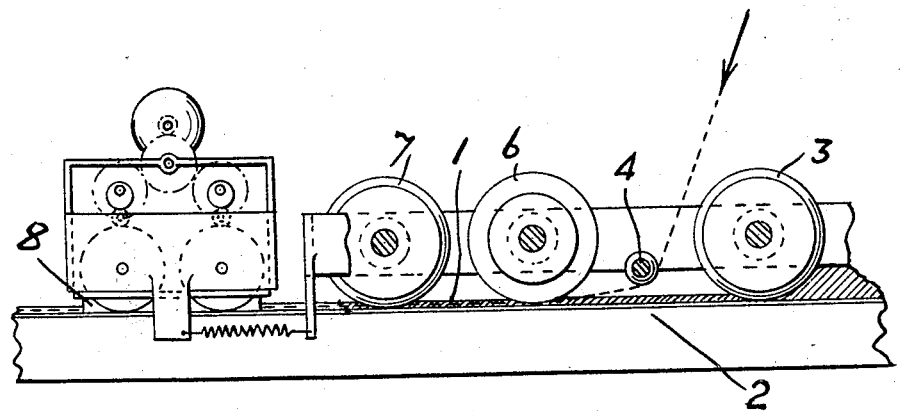
Figure 2:
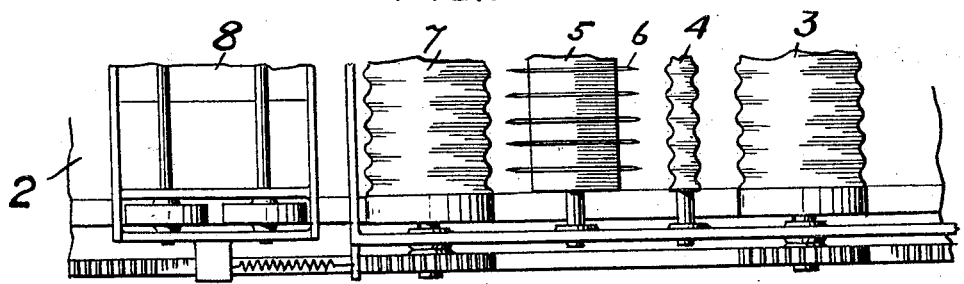
Figure 2 is a partial top or plan view of the apparatus shown in Figure 1.

An endwise corrugated sheet of wire glass 1 is rolled on the lengthwise corrugated table 2. For this purpose use is made of the leading corrugated roll 3, the wire guide roll 4, the embedding roll 5 having ribs 6, the following corrugated roll 7 and the press 8. So far as the present invention is concerned the following roll 7 is the special feature of the apparatus.

Figure 3:
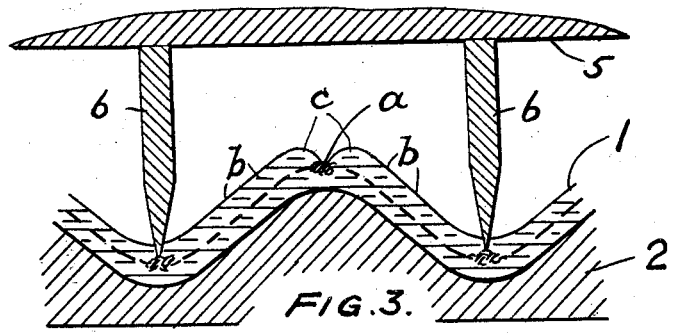
Figure 3 is a diagrammatic and schematic view illustrative of the wounds, cuts or incisions formed at the peaks of the corrugations by the knots or twists of the wire mesh.
Figure 4:
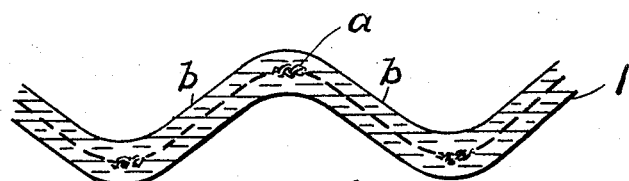
Figure 4 is a like view showing that the wounds, cuts or incisions have been healed by pushing the glass upward from the valleys toward the peaks.

Referring to Figure 3 it frequently happens that a knot or twist in the wire mesh enters the sheet 1 at the top or peak of a corrugation. Such a knot is indicated at $a$. When this occurs the wound, cut or incision $c$, in the glass, is such that glass flowing down from the top or peak of the corrugation toward the valleys, as indicated at $b$, tends to widen or enlarge the cut, wound or incision. According to my invention the glass, generally indicated at $b$, is pushed upward from the valleys toward the top or peak of the corrugation closing the wound, cut or incision, as indicated at Figure 4, thus producing a perfect sheet of glass.

It will be obvious to those skilled in the art to which the invention relates that modifications may be made in details of procedure and in matters of mere form without departing from the spirit of the invention which is not limited to such matters or otherwise than as the prior art and the appended claim may require.

I claim:

A process of the manufacture of corrugated wire glass, comprising the following steps: embedding wire mesh into the fluid glass which causes wounds at the peaks of the corrugations of the glass; closing the wounds by rolling the glass on a line surface of glass to push the plastic glass from the valleys toward the peaks to close the wounds; and pressing the glass to smooth its surface.

ARNO SHUMAN.